(12) United States Patent
Scheufele

(10) Patent No.: US 8,011,267 B2
(45) Date of Patent: Sep. 6, 2011

(54) TOOTHED MOBILE PART FOR PLAY TAKE-UP IN A GEAR, PARTICULARLY IN HOROLOGY

(75) Inventor: Karl-Friedrich Scheufele, Prangins (CH)

(73) Assignee: Chopard Manufacture SA, Fleurier (CH)

( * ) Notice: Subject to any disclaimer, the term of this patent is extended or adjusted under 35 U.S.C. 154(b) by 542 days.

(21) Appl. No.: 12/136,791

(22) Filed: Jun. 11, 2008

(65) Prior Publication Data

US 2008/0307915 A1 Dec. 18, 2008

(30) Foreign Application Priority Data

Jun. 12, 2007 (EP) .................................... 07011469

(51) Int. Cl.
*F16H 55/18* (2006.01)
*F16H 55/16* (2006.01)

(52) U.S. Cl. ................. 74/461; 74/409; 74/437; 74/440

(58) Field of Classification Search ................... 74/461, 74/457, 460, 437, 440, 443, 450, 468, 409
See application file for complete search history.

(56) References Cited

U.S. PATENT DOCUMENTS

| | | | | |
|---|---|---|---|---|
| 2,335,504 A | * | 11/1943 | Gazda | 74/462 |
| 3,550,418 A | * | 12/1970 | McLeod | 72/192 |
| 3,636,792 A | * | 1/1972 | Vigh | 74/461 |
| 4,127,041 A | * | 11/1978 | Imazaike | 74/411 |
| 4,541,293 A | * | 9/1985 | Caugant et al. | 74/89.18 |
| 2006/0048596 A1 | | 3/2006 | Wiederrecht | |
| 2007/0012134 A1 | | 1/2007 | Daout | |
| 2007/0180943 A1 | | 8/2007 | Daout | |

FOREIGN PATENT DOCUMENTS

| | | | |
|---|---|---|---|
| EP | 1380772 | | 2/2004 |
| EP | 1555584 | | 7/2005 |
| EP | 1744081 | | 1/2007 |
| JP | 58054266 A | * | 3/1983 |
| JP | 63130961 | | 6/1988 |
| WO | WO 2004008004 | | 1/2004 |

OTHER PUBLICATIONS

Search report in corresponding EP 07011469, Apr. 15, 2008.

* cited by examiner

*Primary Examiner* — Richard W Ridley
*Assistant Examiner* — Terence Boes
(74) *Attorney, Agent, or Firm* — Young & Thompson

(57) ABSTRACT

A toothed mobile part (1) for play take-up in a gear, particularly in horology, having certain (7) of its teeth fixed and entirely rigid, and other (8) of its teeth each intercalated between two rigid teeth (7) and elastically deformable, is characterised in that said elastically deformable teeth (8) consist of spring blades each comprising a gear flank (9), and in that for each spring blade (8) the distance (12) measured on the pitch circle (13) of the mobile part (1), between the gear flank (9) of the spring blade (8) and the corresponding flank (10) of the one among the two adjacent rigid teeth (7) facing the gear flank (9) is smaller than the distance (14), again measured on the pitch circle (13) of mobile part (1), between the gear flank (9) and the corresponding flank (10) of the other adjacent rigid tooth (7).

17 Claims, 5 Drawing Sheets

US 8,011,267 B2
TOOTHED MOBILE PART FOR PLAY TAKE-UP IN A GEAR, PARTICULARLY IN HOROLOGY

BACKGROUND OF THE INVENTION

The present invention relates to a toothed mobile part such as a wheel, pinion, or rack for a gear, particularly in horology.

It is known that in timepieces such as wristwatches, gear backlash detracts from the display precision. In the case of an eccentric hand, for example, gear backlash may cause the hand to quaver under the effect of movements of the user. In displays with a retrograde hand, such as for indication of the equation of time, the hand may start to move in the other direction only when the plays have been taken up, a certain time after inversion of the movement of the gear train driving it. The plays of gears may accumulate within a given gear train. Plays therefore are so much more important and detrimental the more gears exist in the gear train.

Toothed mobile parts allowing the play of a gear to be taken up have been described in patent applications WO 2004/008004, EP 1,555,584, and EP 1,744,081. These mobile parts have teeth that are larger than normal teeth in order to reduce the space between any two consecutive teeth, and thus to reduce or eliminate the play, but may become deformed or move elastically in the case of gripping in order to avoid gear blocking. The elastic deformation or mobility of the teeth is obtained by slots and/or hollows machined into the teeth or into the plate of the mobile part. In certain embodiments proposed, the teeth consist of a rigid segment and an elastic segment that may lean against the rigid segment in the case of gripping. In other embodiments the teeth consist of two elastic segments that may lean against each other. In still other embodiments, the teeth are rigid but linked elastically through flexible blades to the plate of the mobile part. In an embodiment illustrated in FIG. 9 of document EP 1,555,584, every other tooth has a rigid segment and an elastic segment, the remaining teeth are fixed and entirely rigid.

It is a disadvantage of the toothed mobile parts for the takeup of play that have been mentioned above, that they are only able to take up a relatively slight play, because the elastic segments of the teeth have small dimensions and during gripping of the gear must rapidly come up against a rigid segment in order not to overstep their elastic limit.

SUMMARY OF THE INVENTION

The present invention aims at remedying this disadvantage, and to this end proposes a toothed mobile part for play take-up in a gear, particularly in horology, that has certain of its teeth fixed and entirely rigid, and other of its teeth each intercalated between two of said rigid teeth and elastically deformable, characterised in that said elastically deformable teeth consist of spring blades each having a gear flank, and in that for each spring blade the distance measured on the pitch circle of the mobile part, between the gear flank of the spring blade and the corresponding flank of the one among the two adjacent rigid teeth facing the gear flank is smaller than the distance, again measured on the pitch circle of the mobile part, between the gear flank and the corresponding flank of the other adjacent rigid tooth.

The present invention also proposes a gear comprising a toothed mobile part such as defined hereinabove, and a second mobile part engaged with the toothed mobile part.

Particular embodiments of the invention are defined in the appended dependent claims 2 to 4 and 6 to 9.

BRIEF DESCRIPTION OF THE DRAWINGS

Further characteristics and advantages of the present invention will become apparent when reading the following detailed description of several embodiments that is given while referring to the appended drawings in which:

Referring to FIGS. 1 to 3, a gear for a timepiece, and particularly a wristwatch, according to a first embodiment of the invention comprises a toothed driving wheel 1 for play take-up and a driven pinion 2. In a typical, though not exclusive application of the invention, the arbor of pinion 2 holds an indicator hand (not represented) moving above a dial, for instance a decentred seconds hand. The directions of rotation of wheel 1 and pinion 2 are indicated by arrows 3, 4. In the example represented, the inner part of the toothed wheel 1 is hollowed and includes a felloe 5 and radial arms 6, but in a variant could be full.

Figure 1:
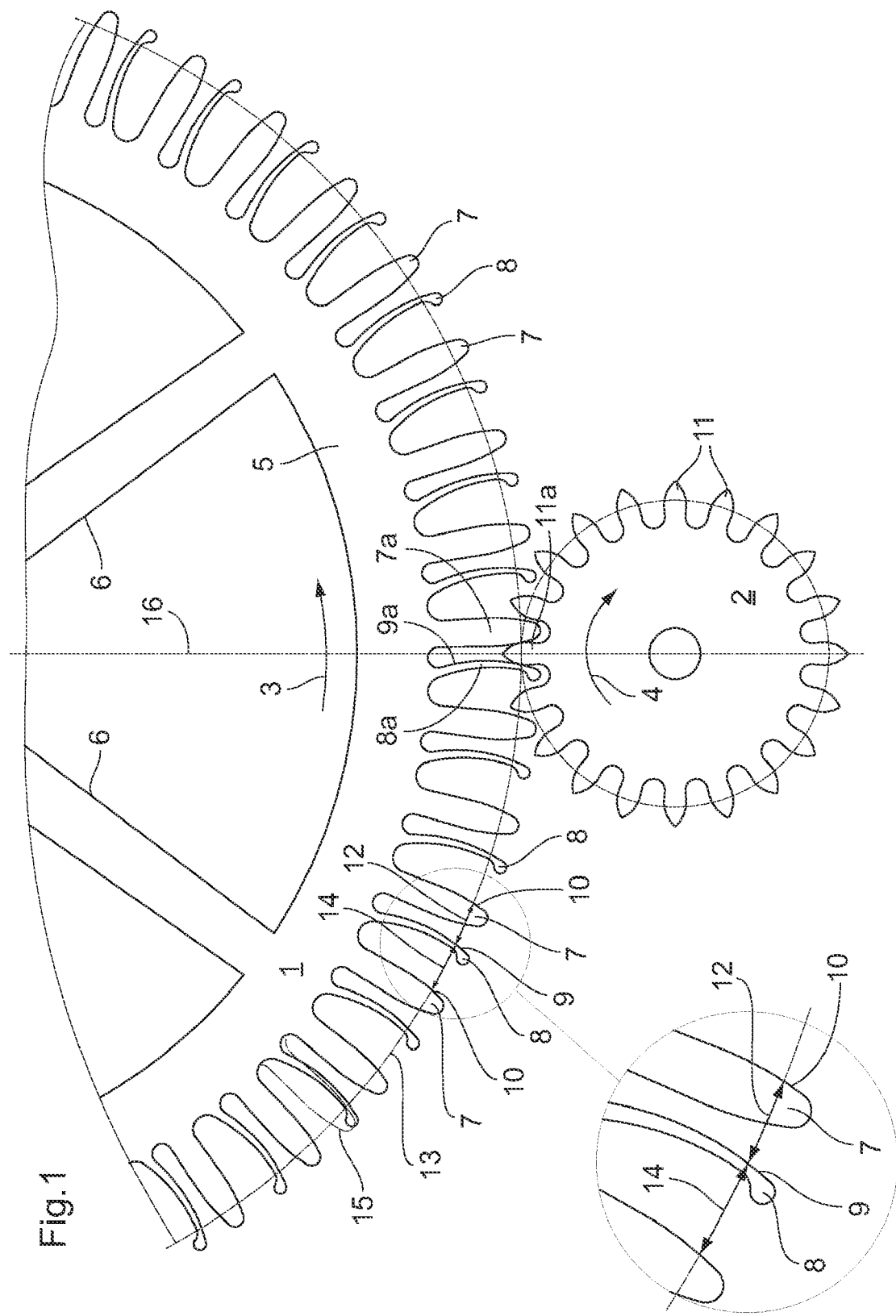
FIG. 1 is a partial plan view of a play take-up gear according to a first embodiment of the invention in a neutral position.

Wheel 1 comprises teeth 7 regularly distributed over its periphery. These teeth 7 are fixed relative to the inner part 5, 6 of wheel 1. In addition, these teeth 7 are entirely rigid, that is, do not have any elastic part. Every other tooth 7 has been omitted in order to make room for spring blades 8 intercalated between the teeth 7. Each spring blade 8 is attached to felloe 5 by one of its ends while its other end is free. Each spring blade 8 is curved and has a convex gear flank 9 which in its functional top portion has a profile that is similar to that of the top portion of the corresponding flank 10 of the rigid teeth 7.

Each spring blade 8 thus plays the part of a tooth, and hence leaves two sufficiently large spaces between it and the two rigid teeth 7 between which it is located, in order to receive teeth 11 of pinion 2. In addition to their gear function, the spring blades 8 serve to take up the gear play. To this end each spring blade 8 is closer to one of its two adjacent rigid teeth 7 than to the other. More precisely, the distance 12 measured on the pitch circle 13 of wheel 1 between gear flank 9 of spring blade 8 and the corresponding flank 10 of the one among the two adjacent rigid teeth 7 facing the gear flank 9 is smaller than the distance 14, again measured on the pitch circle 13, between gear flank 9 and the corresponding flank 10 of the other adjacent rigid tooth 7. In other words, the gear flank 9 of each spring blade 8 is closer to the adjacent rigid tooth 7 facing it than would be the corresponding flank of a normal tooth shown in dotted lines at reference mark 15, if every other tooth 7 had not been replaced by spring blades 8.

With this arrangement of the elastic blades 8, at least part of the gear play can be taken up. For the purposes of taking up this play completely, the distance between each spring blade 8 and the rigid tooth 7 that is closer to it is selected so that in a neutral position of the gear as shown in FIG. 1 where the line passing through the centre of pinion 2 and the tip of one 11a of the teeth 11 of pinion 2 coincides with the line 16 passing through the respective centres of pinion 2 and wheel 1 ("line of centres"), and where said tooth 11a is located between the gear flank 9a of one spring blade 8a and one rigid tooth 7a, said tooth 11a is slightly pressed against the rigid tooth 7a by spring blade 8a.

Figure 2:
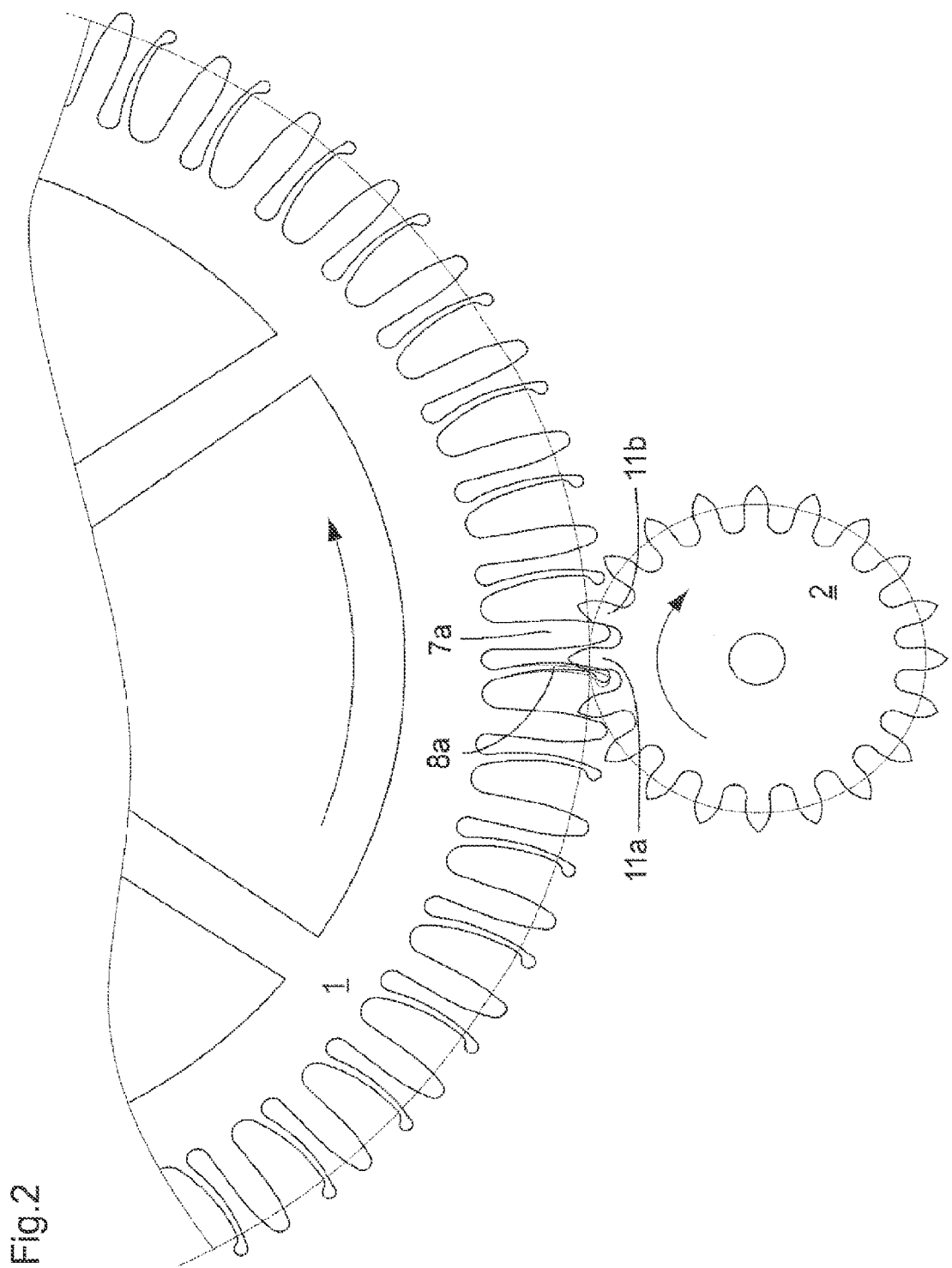
FIG. 2 is a partial plan view of the gear according to the first embodiment of the invention in a position that follows the one of FIG. 1.
Figure 3:
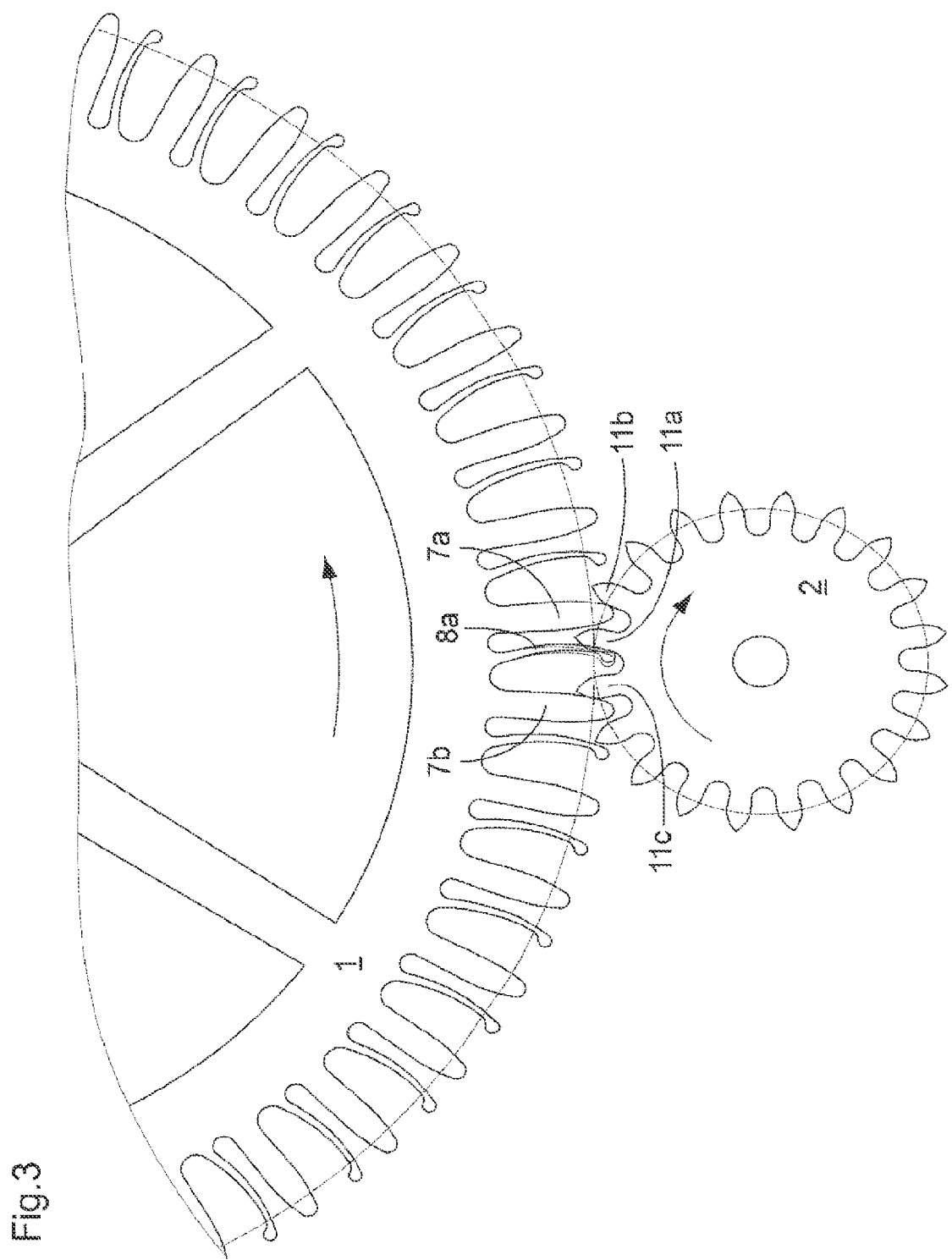
FIG. 3 is a partial plan view of the gear according to the first embodiment of the invention in a position that follows the one of FIG. 2.

Torque transmission between wheel 1 and pinion 2 is secured in large part by the rigid teeth 7, and in small part only by the spring blades 8. FIG. 2 shows a position that follows the one illustrated in FIG. 1. From the position of FIG. 1 to that of FIG. 2, tooth 11a of pinion 2 is first driven by spring blade 8a, but soon it is the rigid tooth 7a that takes over, by pushing a downstream tooth 11b of pinion 2. A little later (FIG. 3) the rigid tooth 7a still pushes the downstream tooth 11b of pinion 2 while an upstream tooth 11c of pinion 2 is simultaneously pushed by the rigid tooth 7b located on the other side of spring blade 8a. In the positions of FIGS. 2 and 3, spring blade 8a is elastically tensioned by tooth 11a in order not to block the gear. This tension is limited to a value below the elastic limit of blade 8a, by the double contact between the rigid teeth 7a, 7b and the teeth 11b, 11c of pinion 2.

DESCRIPTION OF PREFERRED EMBODIMENTS

In the neutral position illustrated in FIG. 1, the gear is without play. In the positions illustrated in FIGS. 2 and 3, when an abrupt movement of the user or an impact causes the contact between the rigid teeth 7a, 7b and the teeth 11b, 11c of pinion 2 to be lost, the solicited spring blade 8a will immediately take up the play by pushing tooth 11a of pinion 2 against the rigid tooth 7a, and thus prevent a quavering of pinion 2 and of the hand that is rigidly connected with it.

The gear according to the invention may equally well function in the direction opposite to that indicated by arrows 3, 4. Besides, in a variant the pinion 2 could be the driving mobile part, and wheel 1 could be the driven mobile part.

Figure 4:
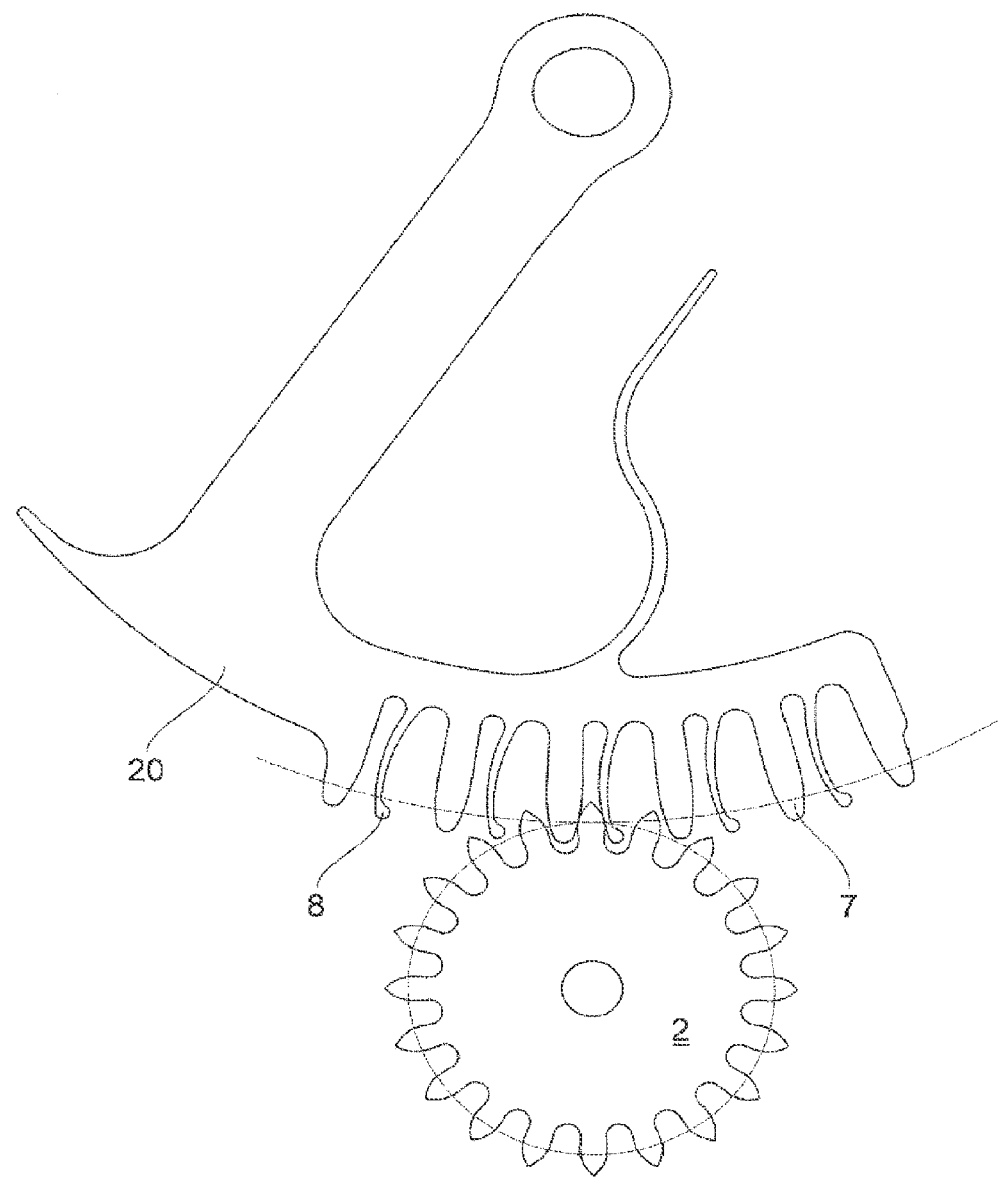
FIG. 4 is a plan view of a gear according to a second embodiment of the invention.

FIG. 4 shows a second embodiment of the invention in which the driving wheel has been replaced by a rack 20 with like teeth. This rack 20 performs a to-and-fro movement for a retrograde display of some quantity, for example the equation of time, by the hand that is rigidly connected with pinion 2. By taking up the play, the spring blades 8 of rack 20 allow pinion 2 to be driven in the opposite direction, immediately after an inversion of the direction of rotation of rack 20.

The spring blades 8 of the gear according to the invention have advantages over the elastic segments of the play take up teeth described in the prior art, in that their shapes and dimensions can be selected with much greater freedom, since they are located in a larger space gained by omitting every other tooth 7. The spring blades 8 thus can have larger dimensions, that is, a larger thickness and greater length, and hence a larger force and/or larger deformability than the elastic segments cited above. It will be observed in this respect that the teeth of wheel 1 and rack 20 in the embodiments represented in the figures are distinctly deeper than usual teeth. Such a depth raises perceptibly the deformability of spring blades 8. These blades may thus take up a larger play, so that the gear according to the invention will be less sensitive to variations in the distance of centres, that is, variations in the distance between the centres of wheel 1 (or rack 20) and pinion 2. It will also be observed that the torque transmitted between wheel 1 (or rack 20) and pinion 2 remains large on account of the fact that this torque is transmitted essentially by the rigid teeth 7.

Figure 5:
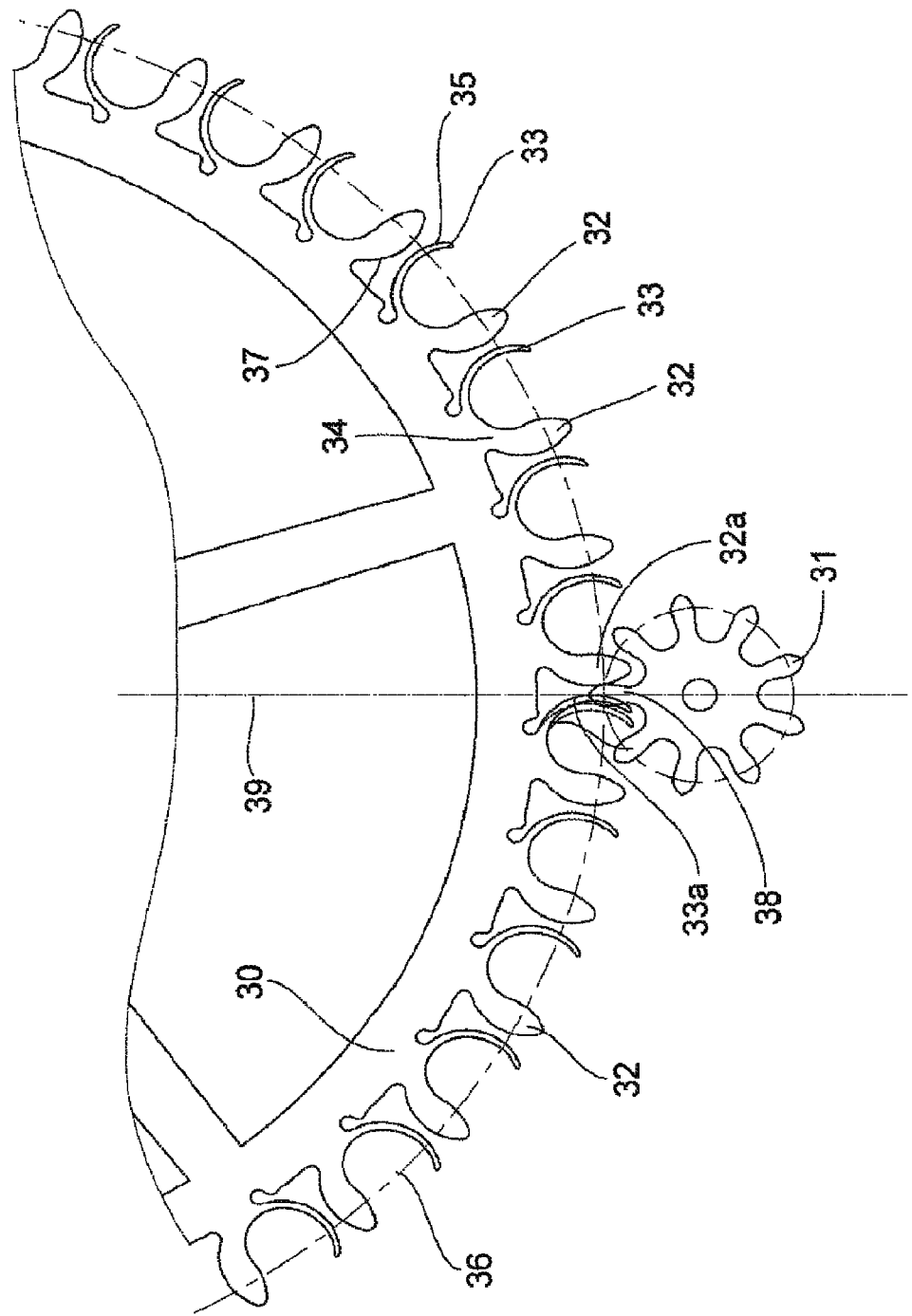
FIG. 5 is a partial plan view of a gear according to a third embodiment of the invention.

A third embodiment of the gear according to the invention is represented in FIG. 5. In this third embodiment, the gear comprises a toothed wheel 30 and a pinion 31. The teeth of wheel 30 consist of fixed, rigid teeth 32 alternating with teeth 33 forming spring blades. Each spring blade 33 has a more pronounced curvature than the blades 8 of the preceding embodiments, so that it may come closer to its associated rigid tooth 32 while preserving a great length, and thus a large deformability. In addition, each spring blade 33 rises from the bottom 34 of the other rigid tooth 32 that is adjacent to it, which facilitates having a strong curvature for these spring blades 33, and at the same time furnishes a particular aesthetic aspect to teeth 32, 33, and wheel 30.

Thus, the convex gear flank 35 of each spring blade 33 faces a convex flank 37 of a rigid tooth 32, and is very close to it on the pitch circle 36 of wheel 30. In a neutral position of the gear, as represented in FIG. 5 where one tooth 38 of the pinion is situated between a spring blade 33a and the associated rigid tooth 32a on the line of centres 39, said tooth 38 thus is rather strongly squeezed between the spring blade 33a and the rigid tooth 32a, so as to produce a click which positions wheel 30 and pinion 31 angularly relative to each other. The gear thus may turn by consecutive jumps, and stop each time in a well defined angular position. This gear positioning is only obtained by the squeezing action exerted by the solicited spring blade 33a. In this way one avoids having to fall back on a jumper spring that would cooperate with a pinion rigidly connected with wheel 30. The gear type represented in FIG. 5 may for instance be utilized to rotate a hand indicating the date, the days of the week, or the months.

The present invention has hereinabove been described, only by way of example. It goes without saying that modifications could be made without leaving the scope of the invention claimed. One could notably envisage different numbers of rigid and elastic teeth on the play take up mobile part. One could for example envisage that only one tooth out of three in the play take up mobile part would be a spring blade, provided that the other mobile part, in this case the pinion, would have a sufficient number of teeth.

The invention claimed is:

1. Toothed mobile part for play take-up in a gear, comprising:
    first teeth that are fixed and entirely rigid and that have first and second flanks that are opposite each other; and
    second teeth each comprising a spring blade intercalated between two adjacent ones of said first teeth and comprising a gear flank directly facing the second flank of a first one of said two adjacent first teeth,
    wherein for each said spring blade a distance measured on a pitch circle of the toothed mobile part, between the gear flank of the spring blade and the first flank of said first one of said two adjacent said first teeth is smaller than a distance measured on the pitch circle of the toothed mobile part between the gear flank and the first flank of a second one of said two adjacent first teeth and wherein each said spring blade is narrower than each of said first teeth as measured on the pitch circle.

2. Toothed mobile part according to claim 1, wherein said first and second teeth alternate on an entire periphery of the toothed mobile part.

3. Toothed mobile part according to claim 2, comprising a wheel.

4. Toothed mobile part according to claim 2, comprising a rack.

5. Gear comprising the toothed mobile part according to claim 2, wherein the toothed mobile part is a first toothed mobile part, and further comprising a second toothed mobile part engaged with the first toothed mobile part.

6. Toothed mobile part according to claim 1, comprising a wheel.

7. Gear comprising the toothed mobile part according to claim 6, wherein the toothed mobile part is a first toothed mobile part, and further comprising a second toothed mobile part engaged with the first toothed mobile part.

8. Toothed mobile part according to claim 1, comprising a rack.

9. Gear comprising the toothed mobile part according to claim 8, wherein the toothed mobile part is a first toothed mobile part, and further comprising a second toothed mobile part engaged with the first toothed mobile part.

10. Gear comprising the toothed mobile part according to claim 1, wherein the toothed mobile part is a first toothed mobile part, and further comprising a second toothed mobile part engaged with the first toothed mobile part.

11. Gear according to claim 10, wherein the gear flank of each said spring blade is sufficiently close to said first one of said two adjacent first teeth so that in a position where a tooth of the second toothed mobile part is situated between the gear flank of said spring blade and a corresponding first one of said two adjacent first teeth and on a line passing through the respective centers of the first and second toothed mobile parts, said tooth of the second toothed mobile part is squeezed against said corresponding first one of said two adjacent first teeth said spring blade.

12. Gear according to claim 11, wherein the second mobile part is a pinion.

13. Gear according to claim 11, wherein the gear flank of each said spring blade is sufficiently close to said first one of said two adjacent first teeth so that the toothed mobile parts are angularly positioned relative to each other at positions where a tooth of the second toothed mobile part is situated between the gear flank of said spring blade and a corresponding first one of said two adjacent first teeth and on said line only through the squeezing action exerted by said spring blade on said tooth of the second toothed mobile part.

14. Gear according to claim 13, wherein the second mobile part is a pinion.

15. Gear according to claim 13, wherein each said spring blade is curved and extends from a bottom of a respective one of said first teeth.

16. Gear according to claim 15, wherein the second mobile part is a pinion.

17. Gear according to claim 10, wherein the second toothed mobile part is a pinion.

* * * * *